United States Patent
Itskovich et al.

(10) Patent No.: US 7,696,757 B2
(45) Date of Patent: Apr. 13, 2010

(54) METHOD AND APPARATUS FOR RESISTIVITY MEASUREMENTS USING DUAL IMPEDANCE VOLTAGE MEASUREMENTS

(75) Inventors: Gregory B. Itskovich, Houston, TX (US); Alexandre N. Bespalov, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 342 days.

(21) Appl. No.: 11/759,700

(22) Filed: Jun. 7, 2007

(65) Prior Publication Data

US 2008/0303526 A1    Dec. 11, 2008

(51) Int. Cl.
*G01V 3/20*    (2006.01)
(52) U.S. Cl. ....................................... 324/367
(58) Field of Classification Search ................. 324/367
See application file for complete search history.

(56) References Cited

U.S. PATENT DOCUMENTS

| | | | |
|---|---|---|---|
| 2,930,969 A | 3/1960 | Baker | 324/10 |
| 3,365,658 A | 1/1968 | Birdwell | 324/10 |
| 4,122,387 A | 10/1978 | Ajam et al. | 324/10 |
| 4,468,623 A | 8/1984 | Gianzero et al. | 324/367 |
| 4,686,477 A | 8/1987 | Givens et al. | |
| 5,502,686 A | 3/1996 | Dory et al. | 367/34 |
| 6,191,588 B1 | 2/2001 | Chen | |
| 6,600,321 B2 | 7/2003 | Evans | 324/369 |
| 6,714,014 B2 | 3/2004 | Evans et al. | 324/374 |
| 6,919,724 B2 | 7/2005 | Cheung et al. | |
| 2003/0155925 A1* | 8/2003 | Tabarovsky et al. | 324/374 |
| 2007/0035304 A1 | 2/2007 | Itskovich et al. | |
| 2008/0288171 A1* | 11/2008 | Itskovich et al. | 702/7 |

FOREIGN PATENT DOCUMENTS

CA    685727    5/1960

* cited by examiner

*Primary Examiner*—Jay M Patidar
(74) *Attorney, Agent, or Firm*—Mossman Kumar & Tyler PC

(57) ABSTRACT

Measurements made by a four terminal resistivity imaging tool in a borehole using a voltage measurement device with two different input impedances. From the two measurements, formation resistivity is determined with minimal sensitivity to standoff.

20 Claims, 5 Drawing Sheets

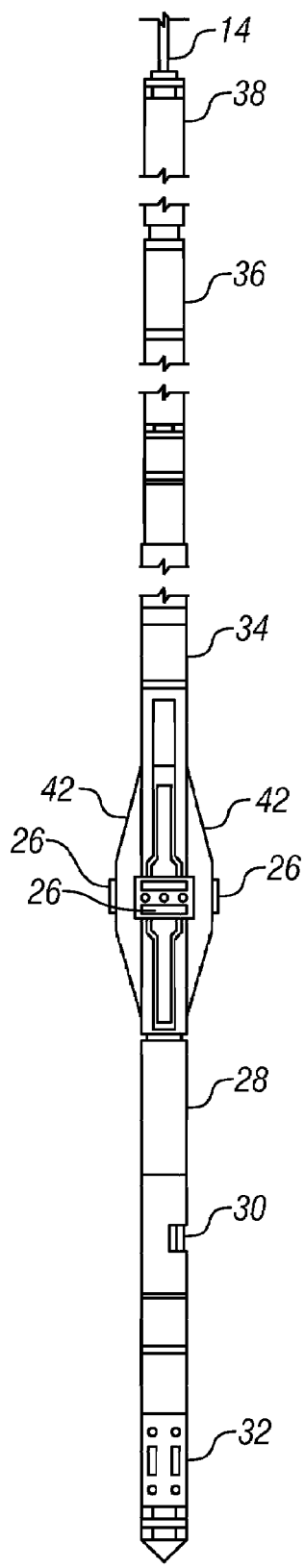
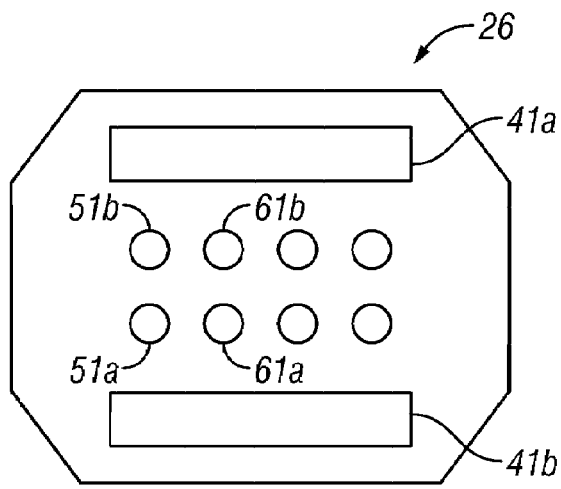
FIG. 2A
(Prior Art)
FIG. 2B

METHOD AND APPARATUS FOR RESISTIVITY MEASUREMENTS USING DUAL IMPEDANCE VOLTAGE MEASUREMENTS

BACKGROUND OF THE INVENTION

1. Field of the Invention

This invention generally relates to exploration for hydrocarbons involving electrical investigations of a borehole penetrating an earth formation. More specifically, this invention relates to highly localized borehole investigations employing the introduction and measuring of individual survey currents injected into the wall of a borehole by capacitive coupling of electrodes on a tool moved along the borehole with the earth formation.

2. Background of the Art

Electrical earth borehole logging is well known and various devices and various techniques have been described for this purpose. Broadly speaking, there are two categories of devices used in electrical logging devices. In the first category, a measure electrode (current source or sink) are used in conjunction with a diffuse return electrode (such as the tool body). A measure current flows in a circuit that connects a current source to the measure electrode, through the earth formation to the return electrode and back to the current source in the tool. In inductive measuring tools, an antenna within the measuring instrument induces a current flow within the earth formation. The magnitude of the induced current is detected using either the same antenna or a separate receiver antenna. The present invention belongs to the first category.

There are several modes of operation: in one, the current at the measuring electrode is maintained constant and a voltage is measured while in the second mode, the voltage of the electrode is fixed and the current flowing from the electrode is measured. Ideally, it is desirable that if the current is varied to maintain constant the voltage measured at a monitor electrode, the current is inversely proportional to the resistivity of the earth formation being investigated. Conversely, it is desirable that if this current is maintained constant, the voltage measured at a monitor electrode is proportional to the resistivity of the earth formation being investigated. Ohm's law teaches that if both current and voltage vary, the resistivity of the earth formation is proportional to the ratio of the voltage to the current.

Birdwell (U.S. Pat. No. 3,365,658) teaches the use of a focused electrode for determination of the resistivity of subsurface formations. A survey current is emitted from a central survey electrode into adjacent earth formations. This survey current is focused into a relatively narrow beam of current outwardly from the borehole by use of a focusing current emitted from nearby focusing electrodes located adjacent the survey electrode and on either side thereof. Ajam et al (U.S. Pat. No. 4,122,387) discloses an apparatus wherein simultaneous logs may be made at different lateral distances through a formation from a borehole by guard electrode systems located on a sonde which is lowered into the borehole by a logging cable. A single oscillator controls the frequency of two formation currents flowing through the formation at the desired different lateral depths from the borehole. The armor of the logging cable acts as the current return for one of the guard electrode systems, and a cable electrode in a cable electrode assembly immediately above the logging sonde acts as the current return for the second guard electrode system. Two embodiments are also disclosed for measuring reference voltages between electrodes in the cable electrode assembly and the guard electrode systems.

Techniques for investigating the earth formation with arrays of measuring electrodes have been proposed. See, for example, the U.S. Pat. No. 2,930,969 to Baker, Canadian Patent No. 685727 to Mann et al., U.S. Pat. No. 4,468,623 to Gianzero, and U.S. Pat. No. 5,502,686 to Dory et al. The Baker patent proposed a plurality of electrodes, each of which was formed of buttons which are electrically joined by flexible wires with buttons and wires embedded in the surface of a collapsible tube. The Mann patent proposes an array of small electrode buttons either mounted on a tool or a pad and each of which introduces in sequence a separately measurable survey current for an electrical investigation of the earth formation. The electrode buttons are placed in a horizontal plane with circumferential spacings between electrodes and a device for sequentially exciting and measuring a survey current from the electrodes is described.

The Gianzero patent discloses tool mounted pads, each with a plurality of small measure electrodes from which individually measurable survey currents are injected toward the wall of the borehole. The measure electrodes are arranged in an array in which the measure electrodes are so placed at intervals along at least a circumferential direction (about the borehole axis) as to inject survey currents into the borehole wall segments which overlap with each other to a predetermined extent as the tool is moved along the borehole. The measure electrodes are made small to enable a detailed electrical investigation over a circumferentially contiguous segment of the borehole so as to obtain indications of the stratigraphy of the formation near the borehole wall as well as fractures and their orientations. In one technique, a spatially closed loop array of measure electrodes is provided around a central electrode with the array used to detect the spatial pattern of electrical energy injected by the central electrode. In another embodiment, a linear array of measure electrodes is provided to inject a flow of current into the formation over a circumferentially effectively contiguous segment of the borehole. Discrete portions of the flow of current are separably measurable so as to obtain a plurality of survey signals representative of the current density from the array and from which a detailed electrical picture of a circumferentially continuous segment of the borehole wall can be derived as the tool is moved along the borehole. In another form of an array of measure electrodes, they are arranged in a closed loop, such as a circle, to enable direct measurements of orientations of resistivity of anomalies. U.S. Pat. No. 6,714,014 to Evans et al, having the same assignee as the present invention and the contents of which are incorporated herein by reference, teaches the use of capacitive coupling with both oil-based mud and water-based mud.

The Dory patent discloses the use of an acoustic sensor in combination with pad mounted electrodes, the use of the acoustic sensors making it possible to fill in the gaps in the image obtained by using pad mounted electrodes due to the fact that in large diameter boreholes, the pads will necessarily not provide a complete coverage of the borehole.

The prior art devices, being contact devices, are sensitive to the effects of borehole rugosity: the currents flowing from the electrodes depend upon good contact between the electrode and the borehole wall. If the borehole wall is irregular, the contact and the current from the electrodes is irregular, resulting in inaccurate imaging of the borehole. A second drawback is the relatively shallow depth of investigation caused by the use of measure electrodes at the same potential as the pad and the resulting divergence of the measure currents. Another drawback is that in formations with low resistivity (such as the Gulf of Mexico), the measured signal is dominated by the effects of the internal impedance of the measurement system and the effects of the borehole fluid. It would be desirable to have an apparatus and method of determination of formation resistivity that is relatively insensitive to borehole rugosity and can be used with either water-based mud or with oil-based mud. The present invention satisfies this need.

SUMMARY OF THE INVENTION

One embodiment is an apparatus for determining a resistivity parameter of an earth formation. The apparatus includes a logging tool configured to be conveyed in a borehole in the earth formation, a pair of current electrodes on the logging tool configured to convey a current into the formation, at least one pair of voltage electrodes disposed between the pair of current electrodes, and at least one voltage measuring device connected to the at least one pair of voltage electrodes. The apparatus further includes a processor configured to determine the resistivity parameter of the earth formation using a first voltage measured at a first input impedance of the at least one voltage measuring device and a second voltage measured at a second input impedance of the at least one voltage measuring device. The processor is further configured to record the determined resistivity parameter on a suitable medium. The current electrodes may be disposed on a nonconducting pad extendable from a body of the logging tool. The at least one pair of voltage electrodes may include a plurality of pairs of voltage electrodes disposed azimuthally. There determined resistivity parameter may be related to a vertical resistivity of the formation. The processor may be further configured to produce an image of the resistivity parameter. The apparatus may further include a conveyance device configured to convey the logging tool into the borehole; the conveyance device may be a wireline or a drilling tubular. The conveyance device may be a drilling tubular and a processor may be further configured to control a direction of drilling.

Another embodiment is a method of determining a resistivity parameter of an earth formation. The method includes conveying a logging tool into a borehole in the earth formation, using a pair of current electrodes on the logging tool for conveying a current into the formation, connecting at least one voltage measuring device to at least one pair of voltage electrodes disposed between the pair of current electrodes, measuring a first voltage between the at least one pair of voltage electrodes at a first value of an input impedance of the voltage measuring device, measuring a second voltage between the at least one pair of voltage electrodes at a second value of an input impedance of the voltage measuring device, determining the resistivity parameter of the earth formation using the first voltage and the second voltage, and regarding the determined resistivity parameter on a suitable medium. The method may further include disposing a pair of current electrodes on a nonconducting pad extendable from a body of the logging tool. The determined resistivity parameter may be related to a vertical resistivity of the formation. An image of the resistivity parameter may be produced. The logging tool may be conveyed into the borehole using a wireline or a drilling tubular. The logging tool may be conveyed into the borehole on a drilling tubular and a direction of drilling may be controlled using the image.

Another embodiment is a computer-readable medium for use with an apparatus for determining a resistivity parameter of an earth formation. The apparatus includes a logging tool configured to be conveyed in a borehole in the earth formation. The apparatus also includes a pair of current electrodes on the logging tool configured to convey a current into the formation, at least one pair of voltage electrodes positioned between the pair of current electrodes, and at least one voltage measuring device connected to the pair of voltage electrodes. The medium includes instructions which enable a processor to determine the resistivity parameter of the earth formation using a first voltage measured at a first input impedance of the voltage measuring device and a second voltage measured at the second input impedance of the voltage measuring device, and record the determined resistivity parameter on a suitable medium. The medium may include a ROM, an EPROM, an EAROM, a flash memory, and/or an optical disk.

BRIEF DESCRIPTION OF THE FIGURES

The present invention is best understood with reference to the accompanying figures in which like numerals refer to like elements and in which:

FIG. 2A (prior art) is a mechanical schematic view of an exemplary imaging tool;

FIG. 2B is a detail view of an electrode pad of an exemplary logging tool;

DETAILED DESCRIPTION OF THE INVENTION

Figure 1:
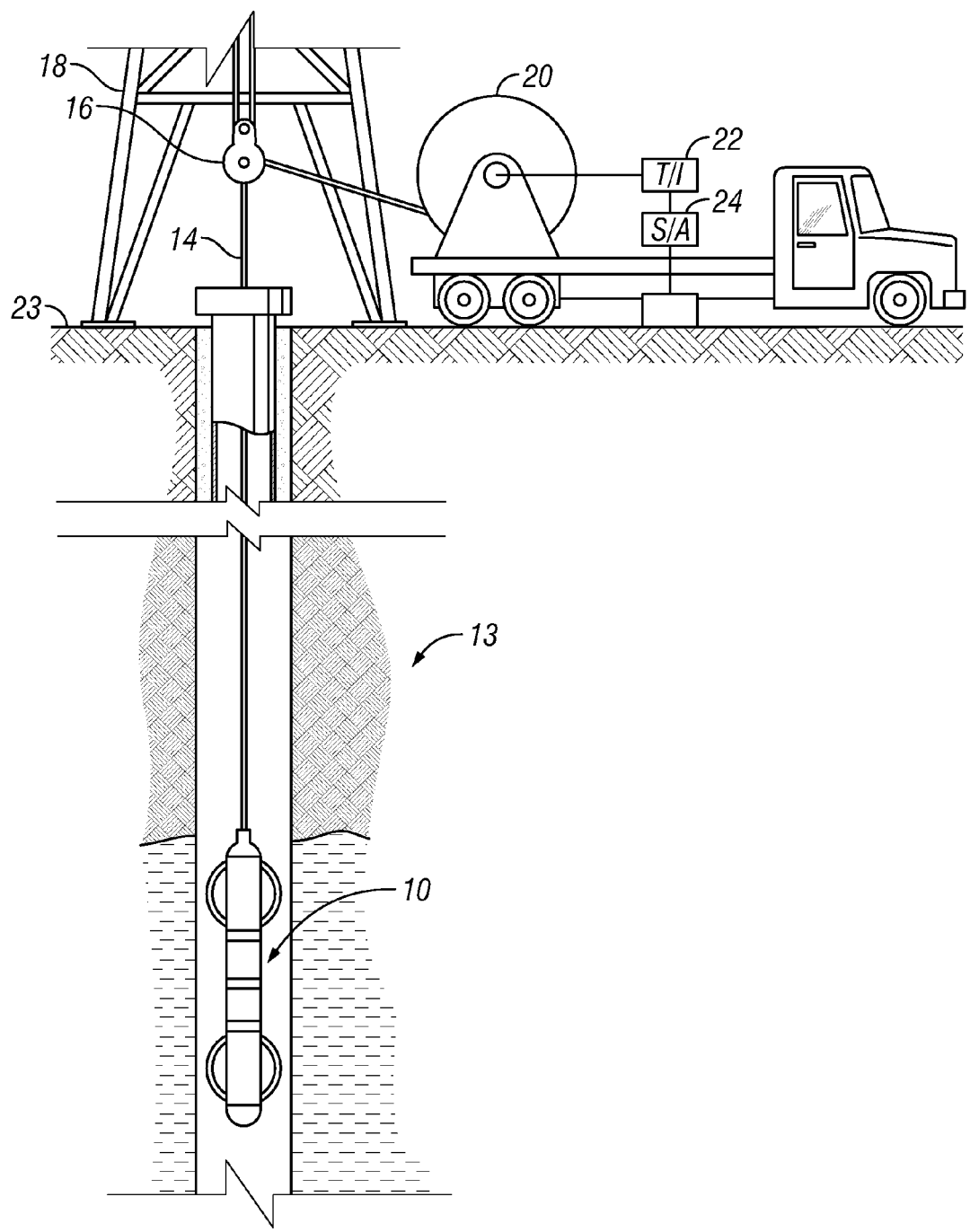
FIG. 1 (prior art) shows an exemplary logging tool suspended in a borehole.

FIG. 1 shows an exemplary imaging tool 10 suspended in a borehole 12, that penetrates earth formations such as 13, from a suitable cable 14 that passes over a sheave 16 mounted on drilling rig 18. By industry standard, the cable 14 includes a stress member and seven conductors for transmitting commands to the tool and for receiving data back from the tool as well as power for the tool. The tool 10 is raised and lowered by draw works 20. Electronic module 22, on the surface 23, transmits the required operating commands downhole and in return, receives data back which may be recorded on an archival storage medium of any desired type for concurrent or later processing. The data may be transmitted in analog or digital form. Data processors such as a suitable computer 24, may be provided for performing data analysis in the field in real time or the recorded data may be sent to a processing center or both for post processing of the data.

FIG. 2A is a schematic external view of a borehole sidewall imager system. The tool 10 comprising the imager system includes resistivity arrays 26 and, optionally, a mud cell 30 and a circumferential acoustic televiewer 32. Electronics modules 28 and 38 may be located at suitable locations in the system and not necessarily in the locations indicated. The components may be mounted on a mandrel 34 in a conventional well-known manner. The outer diameter of the assembly is about 5 inches and the length about fifteen feet. An orientation module 36 including a magnetometer and an accelerometer or inertial guidance system may be mounted above the imaging assemblies 26 and 32. The upper portion 38 of the tool 10 contains a telemetry module for sampling, digitizing and transmission of the data samples from the various components uphole to surface electronics 22 in a conventional manner. If acoustic data are acquired, they are preferably digitized, although in an alternate arrangement, the data may be retained in analog form for transmission to the surface where it is later digitized by surface electronics 22.

Also shown in FIG. 2A are three resistivity arrays 26 (a fourth array is hidden in this view. Referring to FIGS. 2A and 2B, each array includes current electrodes 41a, 41b, which inject electrical currents into the formation. The potential difference between pairs of voltage measuring electrodes (51a, 51b), (61a, 61b) . . . is measured and is representative of the formation impedance between the electrodes. Such a configuration is referred to as a four terminal device (for the two current electrodes and the two voltage electrodes). It should further be noted that while FIG. 2b illustrates a device in which the current flow is vertical, this is not to be construed as a limitation. The method may also be practiced with a device in which a current flow is horizontal.

Figure 3:
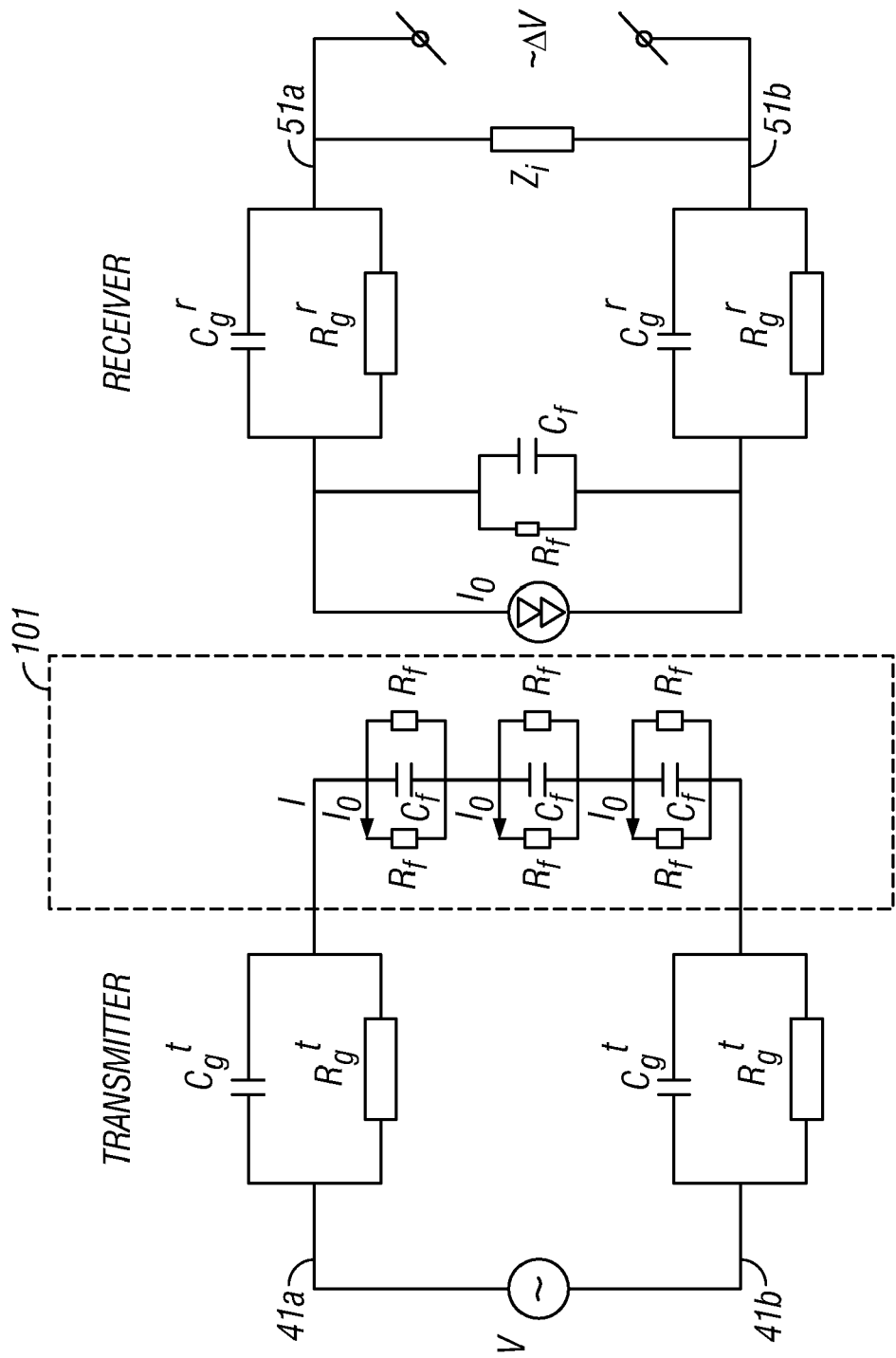
FIG. 3 is an equivalent circuit representation of a resistivity tool in a borehole.

A schematic circuit diagram is presented in FIG. 3. The current electrodes are denoted by 41a, 41b. The impedance $Z_g^t$ between the injection electrodes and the formation is denoted by the capacitance $C_g^t$ and $R_g^t$ The formation is depicted schematically by 101 and includes an impedance $Z_f$ made up of resistance $R_f$ and capacitance $C_f$. A pair of measure electrodes are denoted by 51a, 51b and have associated impedance $Z_g^r$ made up of capacitance $C_g^r$ and resistance $R_g^r$. $Z_i$ is the input impedance of the voltmeter that measures the potential difference between electrodes 51a, .51b If V is the applied voltage to the injection electrode, then the injected current in the formation is $$I = \frac{V}{(Z_f + Z_g^t)}. \tag{1}$$

For the complex current $\dot{I}_g$ providing the voltage drop in the voltmeter we have:

$$\dot{I}_g = \frac{I_0 Z_f}{(Z_f + Z_g^r + Z_i)}, \tag{2}$$

and for the measured complex voltage drop $\Delta \dot{V}$ we get:

$$\Delta \dot{V} = \frac{I_0 Z_f Z_i}{(Z_f + Z_g^r + Z_i)}. \tag{3}$$

Figure 4:
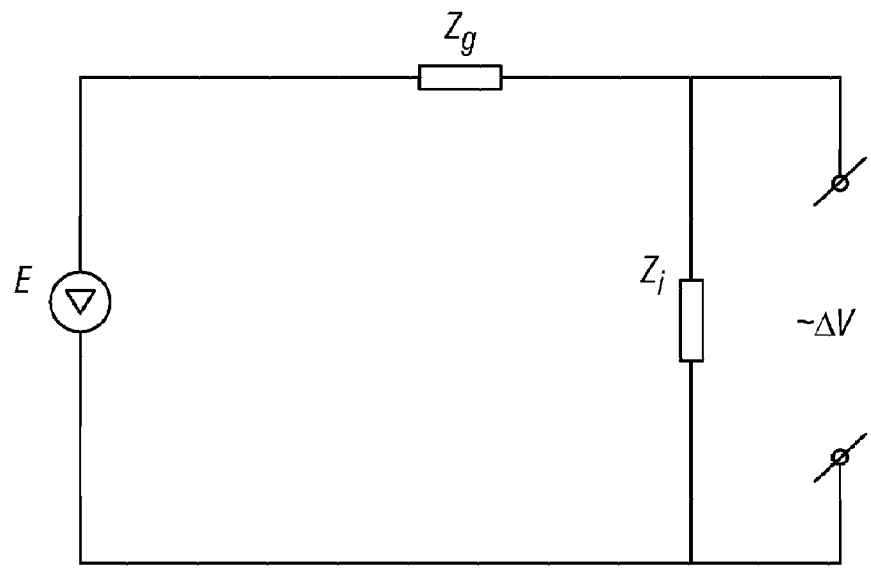
FIG. 4 is a simplified equivalent circuit for the voltage measured.

We assume that the input impedance of the voltage measuring device in combination with impedance of the gap is much larger than the impedance of the formation. In that case we can rewrite eqn. (3) as:

$$\Delta \dot{V} \approx \frac{I_0 Z_f Z_i}{(Z_g^r + Z_i)} = \frac{E Z_i}{(Z_g^r + Z_i)} \tag{4}$$

where E represents the equivalent voltage source due to the voltage drop in the formation shown in the simplified equivalent circuit of FIG. 4.

Eqn.(4) suggests that one way to measure the voltage drop in the formation with a minimum parasitic effect from the gap is to increase the input impedance of the voltmeter. Instead, in the present invention, the voltmeter is provided with a switch that enables measurements with two different internal impedances $Z_i^{(1)}$ and $Z_i^{(2)}$. Then for each voltage measurement, we have:

$$\Delta \dot{V}_1 = \frac{E Z_i^{(1)}}{(Z_g^r + Z_i^{(1)})} \tag{5}$$

$$\Delta \dot{V}_2 = \frac{E Z_i^{(2)}}{(Z_g^r + Z_i^{(2)})} \tag{6}$$

The last two formulas represent a system of two equation with respect to two unknowns E and $Z_g^r$. By solving the system for the voltage source E we have:

$$E = \frac{(Z_i^{(1)} - Z_i^{(2)}) \cdot \Delta \dot{V}_1 \cdot \Delta \dot{V}_2}{(\Delta \dot{V}_2 \cdot Z_i^{(1)} - \Delta \dot{V}_1 \cdot Z_i^{(2)})} \tag{7}$$

Eqn. (7) represents the voltage drop in the formation which is not affected by either the finite (not infinite) value of the input impedance of the voltmeter or by the electrical properties of the gap filled with the mud having some finite conductivity.

Figure 5:
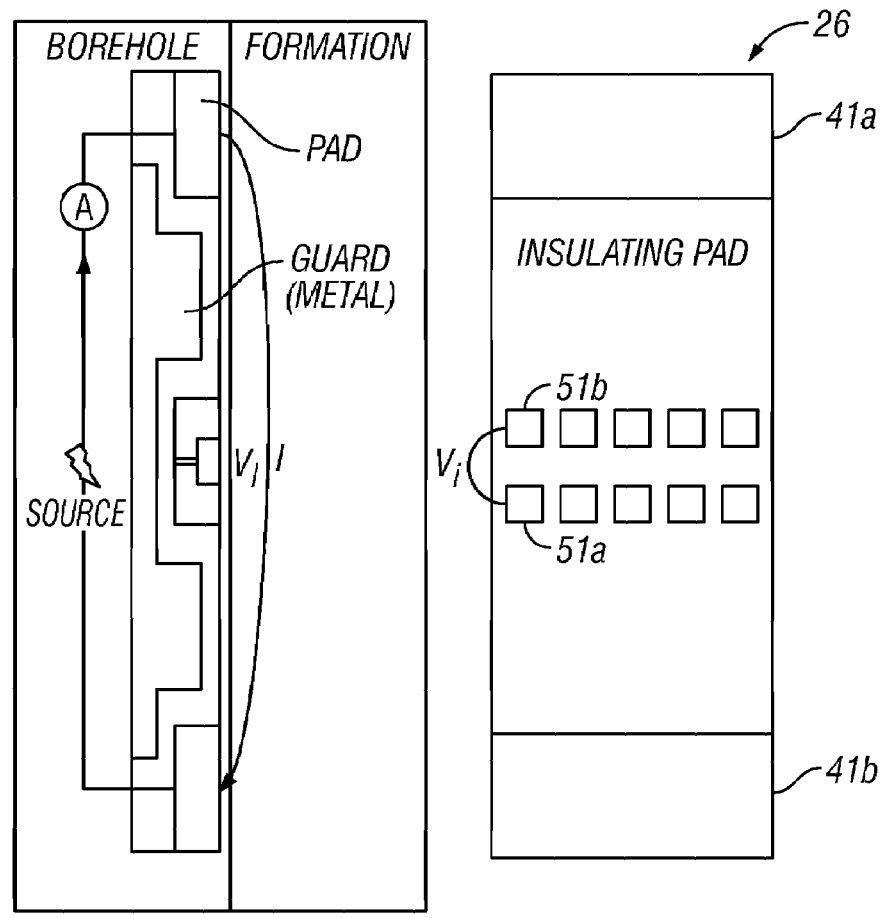
FIG. 5 schematically illustrates logging tool of the present disclosure.

To illustrate the effectiveness of the method, we have conducted mathematical modeling for the formation model approximating electrical conditions in the Gulf of Mexico. The imager pad is as depicted in FIG. 5. Included in the tool is an insulating pad which separates the current electrodes from the voltage measuring electrodes. A metal guard shields the voltage electrodes from the current electrodes.

Figure 6:
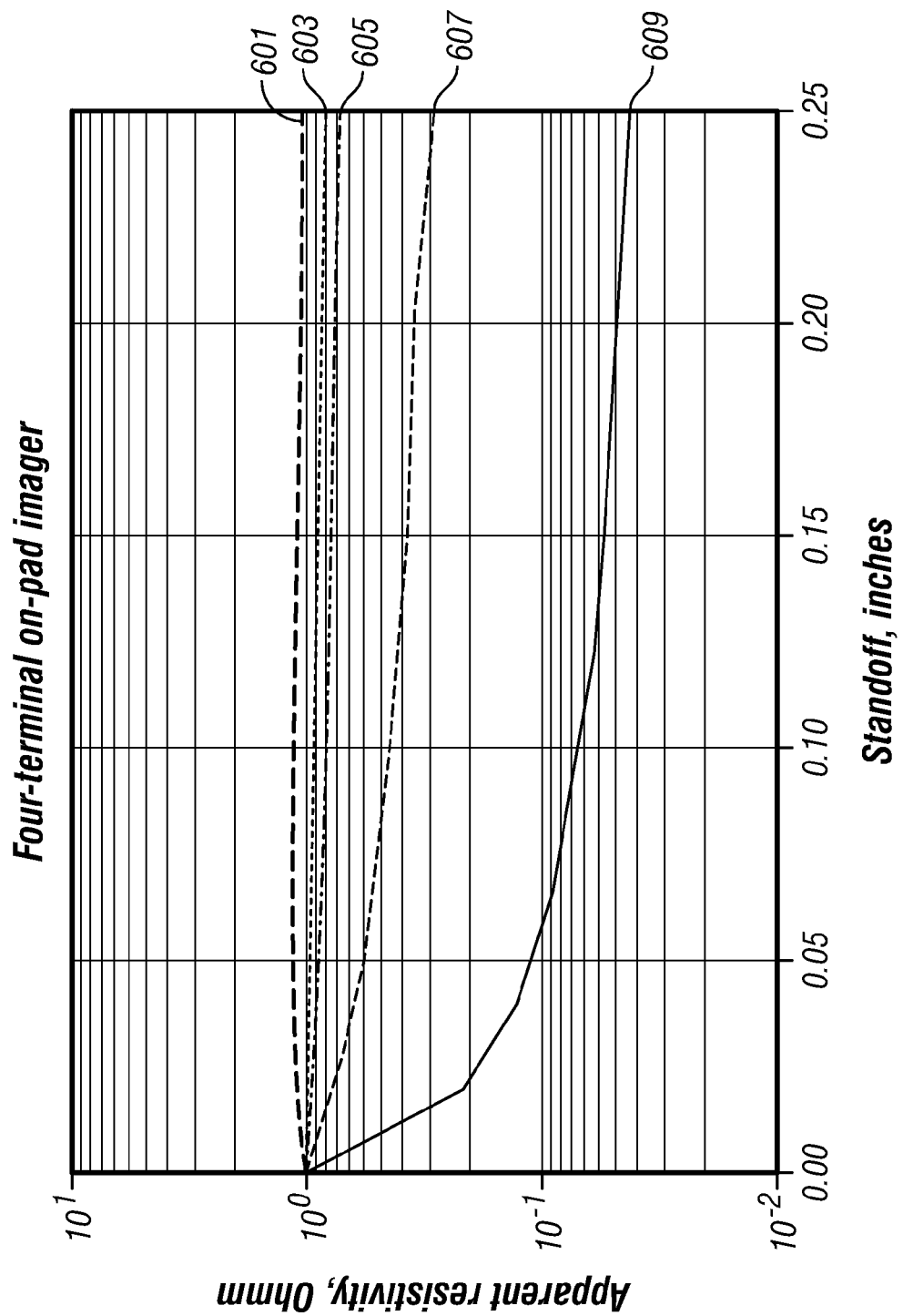
FIG. 6 shows exemplary results using the method of the present invention.

The simulations we carried out with operational frequency set to 40 kHz. The electrode size is 4 mm with 10 mm between an electrode centers. The tool is placed in an 8.5 inch well filled with $10^5$ Ω-m resistive mud with dielectric constant $\in_m = 3$. Resistivity of the homogeneous formation is 1 Ω-m. The pad standoff (abscissa in FIG. 6) is varied from 0 to 0.25 in. The ordinate of FIG. 6 represents the apparent resistivity measured with the different values of the input impedance of the voltmeter. The curve 609 is the apparent resistivity when the voltmeter input impedance is 1 MΩ. The curve 607 and 605 are apparent resistivities for input impedances of 10 MΩ and 100 MΩ respectively. As would be expected, the higher the input impedance of the voltmeter the lower the sensitivity to standoff.

Also, in the same figure we represent the input impedance that is derived from the measurements obtained with two pairs of input impedances according the method discussed above. The curve 601 corresponds to measurements made with voltmeter input impedances of 1 MΩ and 10 MΩ, while the curve 603 corresponds to measurements made with voltmeter input impedances of 10 MΩ and 100 MΩ. As can be seen, the method of the present invention gives the results that are basically insensitive to the tool standoff.

The resistivity parameter and resistivity image obtained by the apparatus and method discussed above may be recorded on a suitable medium. They may further be used for interpreting formation dips using known methods. Such determinations of dip are useful and mapping the structure and stratigraphy of subsurface earth formations—an important step in evaluating hydrocarbon potential of an earth formation. Those skilled in the art would recognize that for producing a resistivity image using a wireline conveyed device, a plurality of pairs of voltage-measuring electrodes would be desirable. On the other hand, for producing a resistivity image using a bottomhole assembly conveyed on a drilling tubular, a single pair of voltage-measuring electrodes is sufficient.

Those versed in the art would recognize that the method described above could also be performed using an apparatus in which the current electrodes and the voltage measuring electrodes are azimuthally separated on the pad. In such a case, a horizontal formation resistivity would be measured in an anisotropic medium.

The invention has further been described by reference to logging tools that are intended to be conveyed on a wireline. However, the method of the present invention may also be used with measurement-while-drilling (MWD) tools, or logging while drilling (LWD) tools, either of which may be conveyed on a drillstring or on coiled tubing. An example of a resistivity imaging tool for MWD use is discloses in U.S. Pat. No. 6,600,321 to Evans, having the same assignee as the present invention and the contents of which are incorporated herein by reference. Measurements made while drilling may be used in reservoir navigation. See, for example, U.S. patent application Ser. No. 11/489,875 of Wang et al., having the same assignee as the present application and the contents of which are incorporated herein by reference.

Implicit in the processing of the data is the use of a computer program implemented on a suitable machine readable medium that enables the processor to perform the control and processing. In the context of the present disclosure, the processor is configured to selectively alter the input impedance of the voltmeter and process the measurements to provide an estimate of the formation resistivity. The term processor as used in this application is intended to include such devices as field programmable gate arrays (FPGAs). The machine readable medium may include ROMs, EPROMs, EAROMs, Flash Memories and Optical disks. As noted above, the processing may be done downhole or at the surface.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. An apparatus for determining a resistivity parameter of an earth formation, the apparatus comprising:
    a logging tool configured to be conveyed in a borehole in the earth formation;
    a pair of current electrodes on the logging tool configured to convey a current into the formation;
    at least one pair of voltage electrodes disposed between the pair of current electrodes;
    at least one voltage measuring device connected to the at least one pair of voltage electrodes, the at least one voltage measuring device being configured to be switched between a first input impedance and a second input impedance; and
    a processor configured to:
        (A) determine the resistivity parameter of the earth formation using a first voltage measured at the first input impedance of the at least one voltage measuring device and a second voltage measured at the second input impedance of the at least one voltage measuring device, and
        (B) record the determined resistivity parameter on a suitable medium.

2. The apparatus of claim 1 wherein the pair of current electrodes are disposed on a nonconducting pad extendable from a body of the logging tool.

3. The apparatus of claim 1 wherein the at least one pair of voltage electrodes further comprises a plurality of pairs of voltage electrodes disposed azimuthally.

4. The apparatus of claim 1 wherein the processor is configured to determine the resistivity parameter of the earth formation using a relationship of the form:

$$E = \frac{(Z_i^{(1)} - Z_i^{(2)}) \cdot \Delta \dot{V}_1 \cdot \Delta \dot{V}_2}{(\Delta \dot{V}_2 \cdot Z_i^{(1)} - \Delta \dot{V}_1 \cdot Z_i^{(2)})}$$

where E is the resistivity parameter, $\Delta \dot{V}_1$ and $\Delta \dot{V}_2$ are the first and second measured voltages and $Z_i^{(1)}$ and $Z_i^{(2)}$ are the first input impedance and the second input impedance respectively.

5. The apparatus of claim 2 wherein a standoff of the pad from a wall of the borehole is less than about ¼ inch (0.63 cm).

6. The apparatus of claim 1 wherein the determined resistivity parameter is related to a vertical resistivity of the formation.

7. The apparatus of claim 1 wherein the processor is further configured to produce an image of the resistivity parameter.

8. The apparatus of claim 1 further comprising a conveyance device configured to convey the logging tool into the borehole, the conveyance device selected from: (i) a wireline, and (ii) a drilling tubular.

9. The apparatus of claim 8 wherein the conveyance device comprises a drilling tubular and wherein the processor is further configured to control a direction of drilling.

10. A method of determining a resistivity parameter of an earth formation, the method comprising:
    conveying a logging tool into a borehole in the earth formation;
    using a pair of current electrodes on the logging tool for conveying a current into the formation;
    connecting at least one voltage measuring device to at least one pair of voltage electrodes disposed between the pair of current electrodes;
    measuring a first voltage between the at least one pair of voltage electrodes at a first value of an input impedance of the at least one voltage measuring device;
    measuring a second voltage between the at least one pair of voltage electrodes at a second value of an input impedance of the at least one voltage measuring device;
    determining the resistivity parameter of the earth formation using the first voltage and the second voltage, and
    recording the determined resistivity parameter on a suitable medium.

11. The method of claim 10 further comprising disposing the pair of current electrodes on a nonconducting pad extendable from a body of the logging tool.

12. The method of claim 10 further comprising using for the at least one pair of voltage electrodes a plurality of pairs of voltage electrodes disposed azimuthally.

13. The method of claim 10 wherein determining the resistivity parameter of the earth formation further comprises using a relationship of the form:

$$E = \frac{(Z_i^{(1)} - Z_i^{(2)}) \cdot \Delta \dot{V}_1 \cdot \Delta \dot{V}_2}{(\Delta \dot{V}_2 \cdot Z_i^{(1)} - \Delta \dot{V}_1 \cdot Z_i^{(2)})}$$

where E is the resistivity parameter, $\Delta \dot{V}_1$ and $\Delta \dot{V}_2$ are the first and second measured voltages and $Z_i^{(1)}$ and $Z_i^{(2)}$ are the first and second input impedances respectively.

14. The method of claim 11 further comprising positioning the pad from a wall of the borehole with an offset less than about ¼ inch (0.63 cm).

15. The method of claim 10 wherein the determined resistivity parameter is related to a vertical resistivity of the formation.

16. The method of claim 10 further comprising producing an image of the resistivity parameter.

17. The method of claim 10 further comprising conveying the logging tool into the borehole using one of: (i) a wireline, and (ii) a drilling tubular.

18. The method of claim 17 further comprising:
 (i) conveying the logging tool into the borehole on a drilling tubular; and
 (ii) controlling a direction of drilling using the image.

19. A computer-readable medium product having stored thereon instructions that when read by a processor cause the processor to perform a method, the method comprising:
 determine a resistivity parameter of the earth formation using first and second voltages measured between a pair of voltage electrodes responsive to a current in an earth formation produced by a pair of current electrodes, the first voltage being measured at a first input impedance of at least one voltage measuring device and the second voltage being measured at a second input impedance of the at least one voltage measuring device, and
 record the determined resistivity parameter on a suitable medium.

20. The medium of claim 19 further comprising at least one of (i) a ROM, (ii) an EPROM, (iii) an EAROM, (iv) a flash memory, and (v) an optical disk.

* * * * *